Aug. 28, 1956 W. A. BISHMAN 2,760,563
TOOL AND METHOD FOR LOOSENING TIRE BEADS
Filed March 13, 1953 3 Sheets-Sheet 1

INVENTOR.
WALTER A. BISHMAN
BY
Williamson, Williamson, Schroeder & Adams
ATTORNEYS.

Aug. 28, 1956     W. A. BISHMAN     2,760,563
TOOL AND METHOD FOR LOOSENING TIRE BEADS
Filed March 13, 1953     3 Sheets-Sheet 2
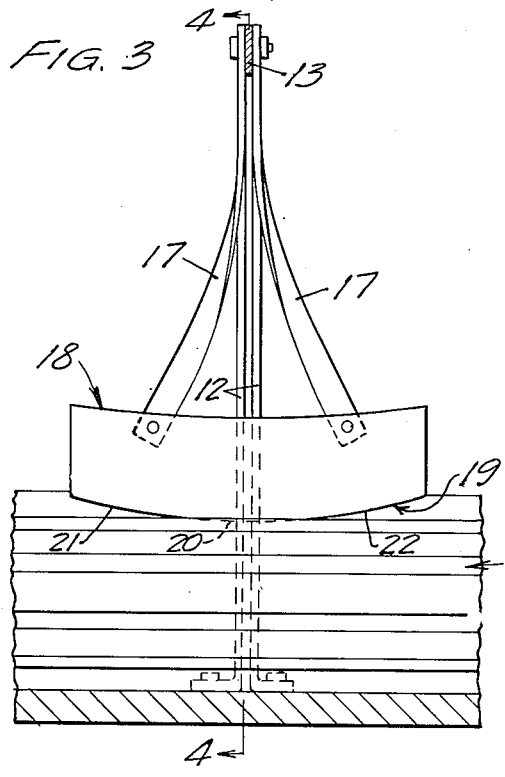
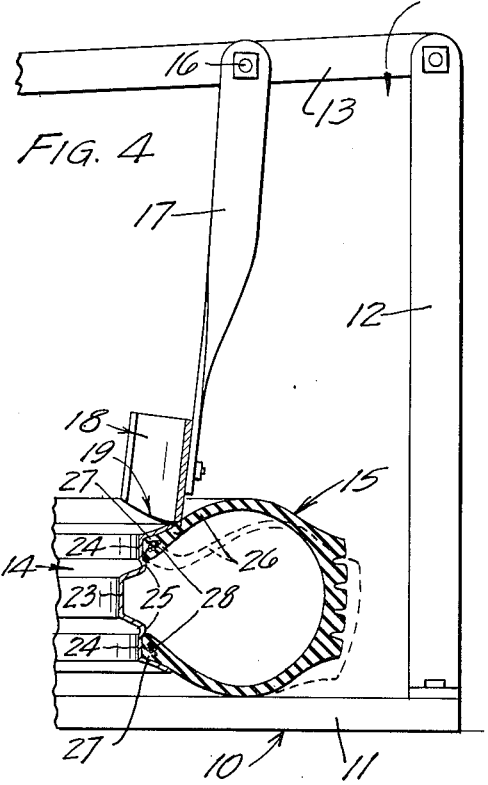
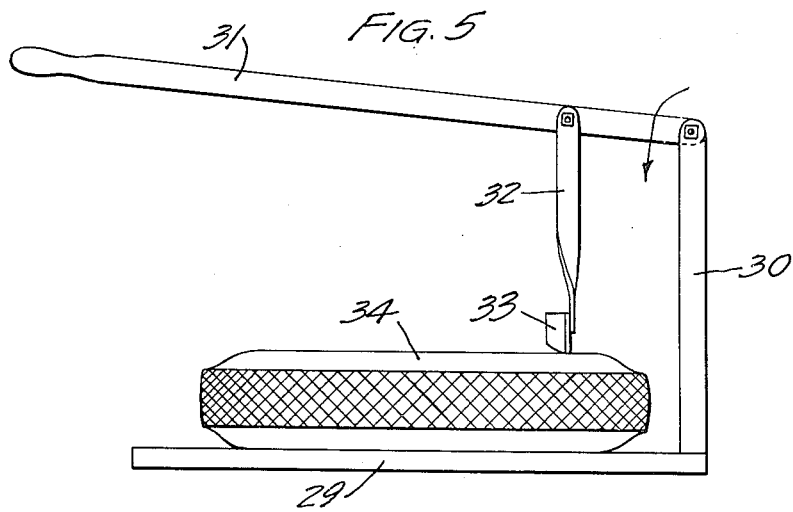
INVENTOR.
WALTER A. BISHMAN
BY
Williamson, Williamson, Schroeder & Adams
ATTORNEYS Aug. 28, 1956 W. A. BISHMAN 2,760,563
TOOL AND METHOD FOR LOOSENING TIRE BEADS
Filed March 13, 1953 3 Sheets-Sheet 3
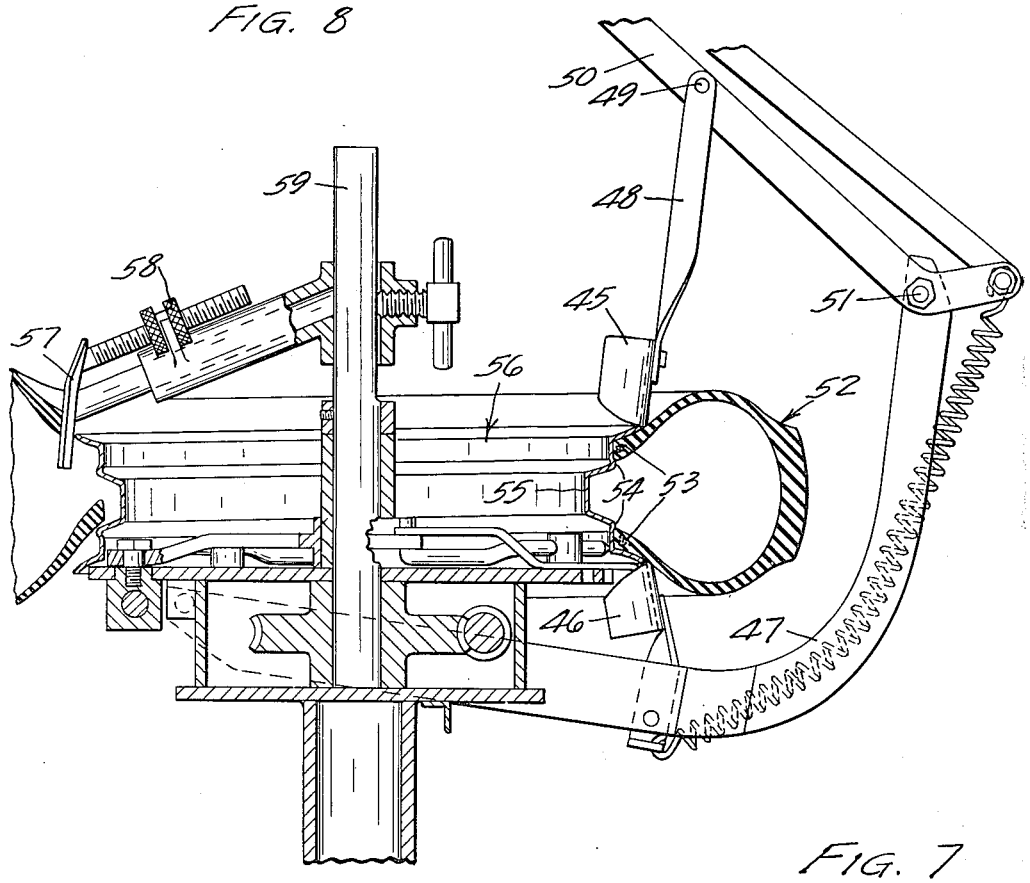
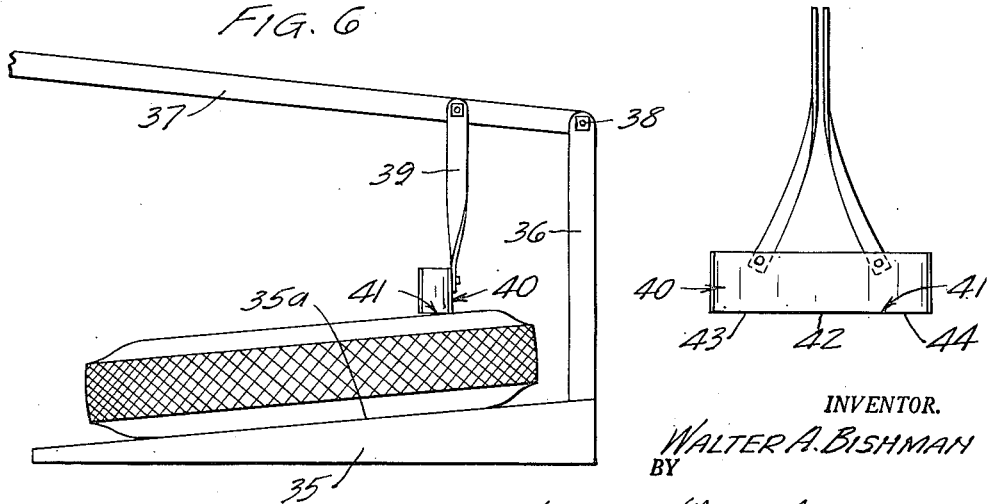
INVENTOR.
WALTER A. BISHMAN
BY
Williamson, Williamson, Schroeder & Adams
ATTORNEYS

United States Patent Office 2,760,563
Patented Aug. 28, 1956

2,760,563
TOOL AND METHOD FOR LOOSENING TIRE BEADS

Walter A. Bishman, Osseo, Minn., assignor to Bishman Manufacturing Co., Osseo, Minn., a corporation of Minnesota Application March 13, 1953, Serial No. 342,129

2 Claims. (Cl. 157—1.26)

This invention relates to tire removing tools. More particularly, it relates to bead loosening devices for tires and especially to devices for loosening the bead of a tire mounted upon a dropped center safety type rim having a bead retaining hump of increased proportions.

For the past several years, automobile wheels of the dropped center type have been provided with an extra ridge extending outwardly from the rim adjacent the dropped center which has a tendency to hold the tire bead upon the bead seat of the rim in the event of a blow-out or flat tire. These bead seats heretofore have been flat and nothing was provided to keep the tire bead from slipping inwardly into the dropped center whereupon the tire would become very loose upon the wheel and make the automobile extremely difficult to control to prevent an accident. However, with the advent of the so-called safety rim, extra provision was made to hold this bead upon its seat and against slippage into the dropped center of the rim even though the tire was deflated while the automobile was traveling rapidly. These rims having such provisions are normally known as safety type rims or hump type rims and are characterized by a ridge or hump on the circumferential surface of the rim positioned inwardly of the bead and between the bead and the dropped center. This ridge or hump serves to retain the bead against slipping into the dropped center of the rim despite deflation of the tire during travel.

Relatively recently, the size of this bead or hump has been increased by wheel manufacturers so as to better hold the tire bead upon the bead seat when a tire is suddenly deflated during travel of the automobile. As a result, when removing a tire from this type of rim, it is considerably harder to slide the tire over this rib or hump to remove the same. This rib, ridge or hump previously had a radius of approximately .367 inches while the latest types of rims to be manufactured have a ridge or rib having a radius of .453 inch. Due to the fact that this so-called hump or ridge has been increased, it makes it almost impossible to slide the tire beads thereover with the normal tire-removing procedures previously known and with the best of tools previously devised for this type of operation. This is especially true because these beads have a cable on their inner portion which makes it practically impossible to stretch the bead sufficiently with a tool to slide the bead over a ridge of the proportions of the latest type safey rims.

Up until now, it has been common practice in tire removing operations to use a camming tool in order to loosen the bead and force it over the smaller ridge and into the dropped center recess. The new types of tires which are being manufactured, however, have rayon cord side walls which are relatively flimsy and do not provide adequate support for such a camming tool. These relatively flimsy side walls will move downwardly when such a spooned tool is used so easily that the side wall of the tire will either precede the bead or go downwardly sufficiently far to in effect lock the bead behind the hump. When the hump was of the smaller radius, the bead would nevertheless slip over the rib or ridge, but the increase in diameter of this type of rib or ridge in the newer type safety rims makes such methods of removal no longer feasible and practical.

The purpose of my bead loosening tool is to eliminate the need of sliding this tire bead over this hump or rib. It employs an entirely new principle to accomplish this movement of the bead over the hump and into the dropped center recess. This new principle of moving the bead over the hump is actually a rolling principle whereby the tool applies pressure a relative distance from the base of the rim, thereby causing the tire bead to roll inwardly toward the dropped center recess. In so doing, the bead rolls itself over this hump or rib and consequently makes it unnecessary for the bead to slide thereover. As a result, the movement of the bead into the dropped center recess and over the hump is accomplished with much less power requirements.

As shown in the drawings and as described hereinafter, my tool is curved to conform to the circumference of the wheel or rim and must be of such length as to contact the tire adjacent the bead along an arc of at least 70 degrees. The tire-contacting portion of the tool is so designed that it does not contact the tire adjacent the bead over the full length of the tool at one time. Instead, the center portion advances in its movement ahead of the end portions of the tool, the result being that the center portion starts the rolling action of the bead before the end portions contact the tire adjacent the bead. The amount of power required to start the rolling action is thereby substantially lessened. As the center portion of the tool rolls this bead over this so-called hump, the end portions engage the tire and immediately thereafter cause the remaining portions of the bead which are in contact with the tool to roll over the hump and then in turn move down over the hump.

It is a general object of my invention to provide a novel and improved bead loosening tool for use in quickly and easily loosening the bead of a tire on a new type safety rim.

A more specific object is to provide a novel and improved bead breaking tool constructed to facilitate the easy breaking of the bead of a tire mounted upon a new type safety rim having a safety hump or rib of increased radius.

A still more specific object is to provide a novel and improved bead loosening tool constructed to initially engage only a narrow portion of the tire adjacent the bead as it is moved at substantially right angles to the tire and to thereafter progressively engage portions of the tire extending to either side of the position initially engaged, to loosen the bead adjacent to such later engaged portions with a minimum of power requirements.

Another object is to provide a bead loosening device of improved efficiency but yet of simple and cheap construction and operation.

Another object is to provide a bead loosening device which will loosen the bead of a tire during a single operation around a sufficient portion of the tire to enable the remainder of the bead to be easily removed manually, and which will require a minimum of force to accomplish this operation.

Another object is to provide a novel and improved method of loosening the bead of a tire and moving the same over the hump of a dropped center type safety rim.

These and other objects and advantages of my invention will more fully appear from the following description made in connection with the accompanying drawings, wherein like reference characters refer to the same or similar parts throughout the several views, and in which:

Fig. 3 is a front elevational view of my bead loosening tool used on one type of bead loosening device;

Fig. 4 is a vertical sectional view of the same taken along approximately line 4—4 of Fig. 3;

Fig. 5 is a side elevational view of another form of bead loosening device utilizing my bead loosening tool and moving the same vertically while the tire is positioned horizontally;

Fig. 6 is a side elevational view of another embodiment of my bead loosening tool used in conjunction with another type of bead loosening device wherein the tool is moved vertically while the tire is supported upon an inclined plane;

Fig. 7 is a front elevational view of the embodiment of my bead loosening tool shown in Fig. 6; and Fig. 8 shows a pair of bead loosening tools constructed in accordance with my invention and mounted upon and used in conjunction with a tire casing mounting and demounting tool.

Figure 1:
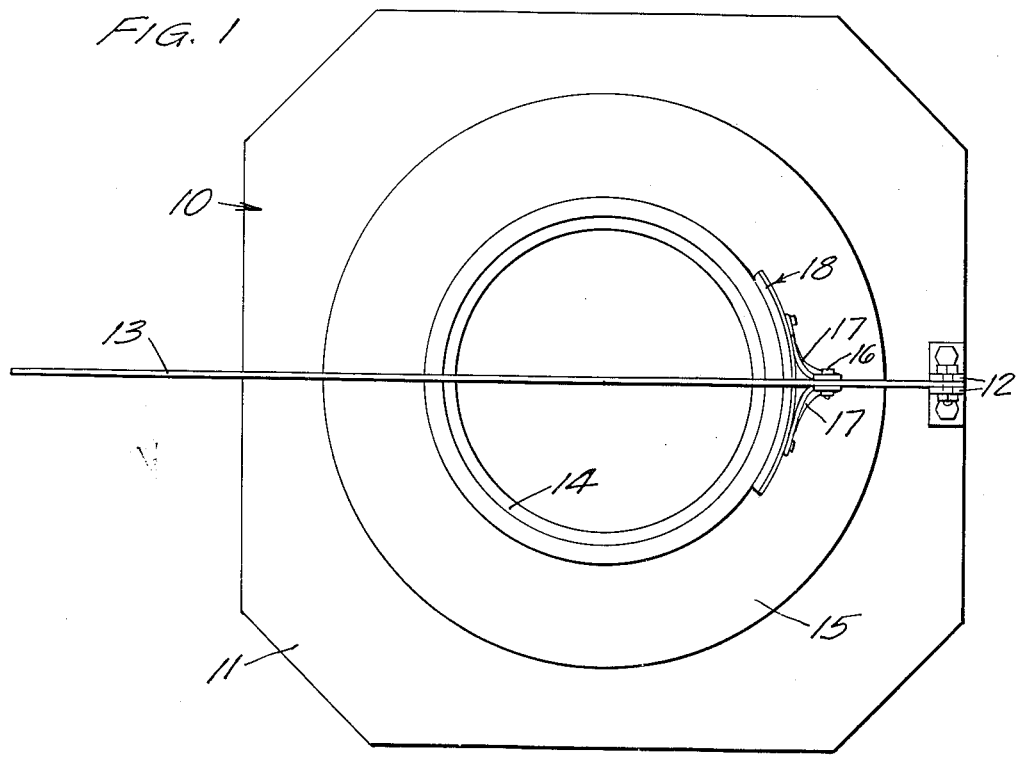
Fig. 1 is a plan view of a bead loosening device including a simple embodiment of my invention.
Figure 2:
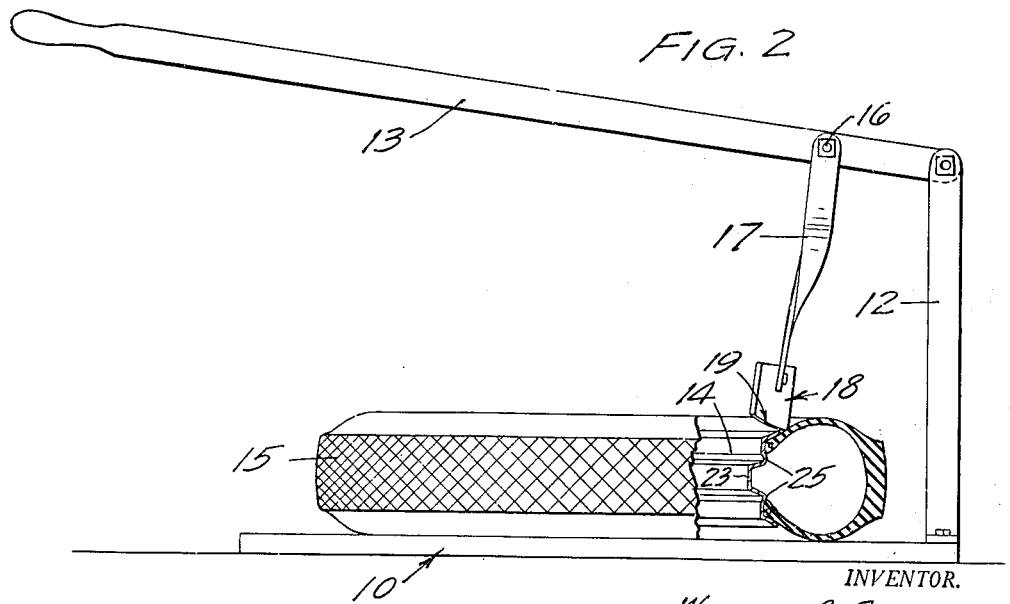
Fig. 2 is a side elevational view of the same with a portion thereof broken away to show the tire in section and the bead loosening tool in side elevation.

Figs. 1-4 show a bead loosening device utilizing one embodiment of my invention. As shown, the bead loosening device indicated generally as 10 has a horizontal base 11 to which is fixedly secured a rigid upstanding pivot support or post 12. Pivotally mounted by one of its end portions at the top of the pivot support 12 is a lever member 13, the lever extending laterally of the pivot post 12 in overhanging position relative to the rim indicated generally as 14 and carrying the tire indicated generally as 15. The lever member 13 is pivotally connected by a pivot pin 16 to a pair of tool supporting arms 17 which carry my bead loosening tool indicated generally as 18 at the lower ends thereof.

My bead loosening tool 18 is comprised of an elongated rigid plate which is curved longitudinally and has a radius of curvature slightly greater than the radius of the bead of the tire to be removed from its rim. This tool 18 has a lower tire-engaging surface 19 which is convexly shaped as best shown in Fig. 3. The convex shape of the tire-engaging surface provides the tire-engaging surface with a leading portion indicated as 20 and two lateral trailing portions indicated by the numerals 21 and 22, all taken relative to the line of movement of the tool in the bead loosening device.

As can best be seen by reference to Fig. 4, the tool support arms 17 are pivoted at such a position upon the medial portions of the lever 13 so that when the lever is moved downwardly in the direction of the arrow shown in Fig. 4 and the tool 18 is adjusted so as to engage the side wall of the tire 15 adjacent to the rim, the tool will be moved downwardly at a slight angle off vertical. In other words, the tool will be moved downwardly and slightly inwardly relative to the center of the rim.

For the sake of reference, the rim will be referred to generally as 14 having a dropped center portion 23, a bead seat 24, and a bead retaining rib 25. The tire 15 has side wall portions 26 and a bead 27 with a cable 28 running therethrough.

Fig. 5 shows another type of bead loosening device having a base member 29, a pivot support 30 and a pressure-inducing lever 31 pivotally mounted upon the upper end portion of the pivot support. Pivotally mounted upon the medial portion of the lever 31 is a pair of tool support arms 32 which carry at their lower end one of my bead loosening tools 33. The main distinction between this structure and the structure shown in Figs. 1-4 is that the upper end portions of the tool supporting arms 32 are pivoted at a point along the length of the lever 31 so that when the lever is moved downwardly in the direction of the arrow, the tool 33 will engage the tire 34 immediately outside the rim and will move in a truly vertical direction instead of slightly inwardly toward the dropped center of the rim. It is possible to obtain satisfactory results through the use of this type of device although the preferred type is shown in Figs. 1-4.

Figs. 6 and 7 show another type of bead loosening device which is a variation of the principle of my invention. The device includes a base member 35 having a pivot support 36 which has a lever member 37 pivotally connected thereto at its upper end portion as at 38. It will be noted that the upper surface 35a of the base member is at an incline so that the tire 36 extends in an inclined plane. The tool support arms 39 are pivotally connected at their upper ends to the medial portion of the lever 37 and carry a differently shaped bead loosening tool indicated generally as 40 at their lower ends. The details of construction of this modified bead loosening tool 40 can best be seen in Fig. 7. By referral to that figure it can be readily seen that this tool 40 is also arcuately shaped along its length. It has a radius of curvature slightly greater than the radius of the bead of the tire. The principal distinction between this tool 40 and the tool 18 is that the lower tire-engaging edge or surface 41 of this tool is straight instead of being convexly shaped. In other words, if the tire is placed upon an inclined surface, the bead loosening tool may have a substantially straight tire-engaging surface since the more lateral portions of the tire will be sloping away from the tire-engaging surface 41 when the tool 40 is moved downwardly as shown in Fig. 6. It can be readily seen that the central portions 42 of the tool 40 will engage the side wall of the tire 36 first and that the more lateral portions 43 and 44 of the tire-engaging surface will engage the tire only after the more central portion 42 has caused the bead adjacent thereto to be rolled over the rib of the rim.

Fig. 8 shows a pair of bead loosening tools 45 and 46 used in conjunction with a tire casing mounting and demounting tool. The lower tool 46 is fixedly mounted upon its support 47 while the upper tool 45 is pivotally carried by tool support arms 48 pivotally mounted at 49 upon a lever member 50 which in turn is pivotally mounted at 51 upon the upper end of the support 47. Thus it can be seen that when the lever 50 is moved downwardly, the side walls of the tire 52 immediately adjacent to the beads 53 and outwardly thereof will be forced inwardly and the beads 53 will be caused to roll inwardly over the ribs 54 and into the dropped center 55 of the rim indicated generally as 56. Once this has been accomplished it is an easy matter to insert the shoe 57 beneath the bead 53 so that the radially extending arm 58 which carries the shoe may be driven around the axis of its supporting post 59 to quickly and easily remove the tire from its rim.

In the use of the structure shown in Figs. 1-4, the rim 14 and its tire 15 are placed upon the base member 11 so as to extend in a horizontal plane. The lever member 13 is then brought downwardly and the leading portion 20 of the tire-engaging surface 19 of the tool 18 is positioned, as best shown in Fig. 4, against the side wall of the tire immediately adjacent to the rim and just outwardly of the bead. It should be noted that the tool is not inserted along the outer wall of the rim 14 and between that wall and the bead 27 as is the normal procedure previously known for removing tires from such rims. Instead, the tire-engaging surface 19 is moved downwardly so as to cause the relatively thin side walls 26 of the tire 15 to collapse inwardly slightly and to cause the bead 27 to roll over the hump or rib 25 and into the dropped center 23 of the rim 14. It should be noted that the bead 27 is definitely not slid over the bead 25 as is the case in the procedures heretofore known for removing such a tire. It should also be noted that the successful operation of the device is not dependent upon a strong side-walled tire for there is no support sought from the side walls of the tire for the tool.

As the leading portion 20 of the tire-engaging surface 19 causes the portion of the bead 27 of the tire 15 adjacent thereto to roll over the rib or ridge 25, the portions of the tire-engaging surface immediately laterally thereof will contact and engage the portions of the tire adjacent thereto and will proceed during the downward movement of the tool 18 to cause the bead adjacent thereto to roll over the rib 25 which tends to hold it out of the dropped center 23. Thus it can be readily seen that there is a progressive loosening of the bead 27 away from the leading portion 20 of the tool 18 and to either side thereof until the extreme lateral portions of the tool engage the tire outside the bead and cause that portion of the bead to roll over the rib 25. When this has been done, the bead has been loosened from the rim along an arc exceeding 70 degrees and it is a simple matter thereafter to manually push the rest of the bead downwardly over the rib 25 since the tire will have been sufficiently loosened by the movement of the freed portion of the bead into the dropped center 23 to permit the same to be accomplished with ease.

It should be noted that because of the fact that only a very small portion of the leading edge 19 of the tool 18 is actively engaged in loosening a portion of the bead at a given time, a minimum of pressure is required to be exerted upon the tool 18. If the tool 18 were to engage the tire throughout its entire length at a given moment and the tool were to be attempted to be moved downwardly to free the bead along its entire length simultaneously, the amount of pressure required would be so excessive as to make the device impractical. I have found that by constructing my tool in the shape shown, the bead can be easily loosened with a pressure of approximately 800 to 900 pounds per square inch.

The structure shown in Fig. 5 illustrates that the tool 18 need not necessarily be urged slightly inwardly toward the center of the rim but may be moved vertically downwardly parallel to the axis of the wheel.

Figs. 6 and 7 illustrate that it is possible to use a bead loosening tool such as the tool 40 which has a relatively straight tire-engaging surface 41 by positioning the tire 36 upon a rather pronounced incline so that the tool approaches the tire at a considerable angle. In this manner the tool, because of its angular approach, retains a leading portion 42 and two lateral trailing portions 43 and 44 to accomplish an efficient loosening of the bead progressively in a manner similar to that accomplished by the structure shown in Figs. 1–4. I have found, however, that the preferred form of the invention is the structure shown in Figs. 1–4.

Fig. 8 illustrates how a tool manufactured in accordance with my invention may be used in conjunction with a tire mounting and demounting device. Fig. 8 illustrates how two of the tools may be used simultaneously to cause the beads 53 to simultaneously roll into the dropped center 55. The function of the tools is the same as in the structure shown in Figs. 1–4 for it engages the side wall of the tire 52 just outwardly of the bead 53 and moves the same inwardly, rolling the bead with it so that the bead will roll over the rib 54 and into the dropped center 55. Again, the tools 45 and 46 have convexly shaped tire-engaging portions so that there is a leading central portion and trailing lateral portions and so that as the lever 50 is moved downwardly the bead will be progressively loosened first by the central portion of the tire-engaging surface of the tool and then progressively outwardly therefrom around the circumference of the bead.

Thus it can be seen that I have provided a novel and improved bead loosening tool which enables a service station operator to quickly and easily remove a tire from a wheel having the new type safety rim with a retaining rib of increased radius. Through the use of my tool it is possible to remove a tire from such a rim with a minimum of effort and permits the operation to be accomplished without costly delay and a needless expenditure of effort. In fact, my invention provides structure for accomplishing the removal of the tire in a manner heretofore unknown for it is practically impossible to remove such a tire by the methods previously known.

It should also be noted that I have provided a novel and improved method for causing the bead of a tire to move inwardly into the dropped center of a dropped center type rim. As pointed out hereinbefore, it is practically impossible to slide a bead having a steel cable therein over a retaining rib of the proportions indicated hereinbefore as being provided on the new safety type rims, and such a bead can be moved thereover in an efficient manner only by utilizing my method.

It will of course be understood that various changes may be made in the form, details, arrangement and proportions of the various parts without departing from the scope of my invention.

What I claim is:

1. A tire removing tool for tires mounted on rims having bead ledges internally of the edges on opposite sides of the rim and a well or dropped portion between said ledges, there being a rib at the internal edge of each ledge, comprising a tire side-wall engaging jaw in the form of an arcuate plate having a work engaging edge, and force applying means connected to the opposite edge of said jaw for holding the jaw and applying the force substantially normally to the plane of the tire at a substantial distance outwardly of said bead, the center portion of said work engaging edge of the arcuate plate being advanced with respect to its outer end portions an amount in excess of the overall width of the tire bead ledge and rib of the rim, whereby corresponding portions of the side wall will be successively flexed at a rate to progressively roll the bead portion of the tire on its ledge and pull it over said rib into said well until a substantial length of said bead that will not spring back onto its ledge upon withdrawal of the jaw has been pulled into said well before the extreme ends of said edge have started to pull their adjacent portions of the bead off its ledge.

2. A tire removing tool as defined by claim 1, wherein said force applying means includes a base upon which the tire is supported, a vertically elongate standard, and a handle pivotally connected adjacent the upper end of said standard, said jaw being pivotally depended from said handle and having a convex work engaging edge.

References Cited in the file of this patent

UNITED STATES PATENTS

| | | |
|---|---|---|
| 1,447,113 | Woodhall | Feb. 27, 1923 |
| 1,615,469 | McKenzie | Jan. 25, 1927 |
| 1,869,244 | Gabler | July 26, 1932 |
| 2,241,886 | Pierce | May 13, 1941 |
| 2,319,155 | Passanante et al. | May 11, 1943 |
| 2,422,467 | Carroll | June 17, 1947 |
| 2,470,107 | Piacenti | May 17, 1949 |
| 2,492,329 | Smith | Dec. 27, 1949 |
| 2,506,007 | Winstead | May 2, 1950 |
| 2,523,979 | Weeks et al. | Sept. 26, 1950 |
| 2,562,995 | Watkins | Aug. 7, 1951 |
| 2,579,868 | Schmid | Dec. 25, 1951 |
| 2,695,659 | Athmann | Nov. 30, 1954 |